*(12)* United States Patent
Klug

(10) Patent No.: US 6,841,248 B2
(45) Date of Patent: Jan. 11, 2005

(54) GRAPHITE ARTICLE COMPRISING A COMPRESSED MASS OF IMPREGNATED GRAPHITE PARTICLES AND A REACTIVE LUBRICANT

(75) Inventor: Jeremy H. Klug, Brunswick, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 0 days.

(21) Appl. No.: 10/113,382

(22) Filed: Mar. 29, 2002

(65) Prior Publication Data

US 2003/0186058 A1 Oct. 2, 2003

(51) Int. Cl.$^7$ ................................................. B32B 9/00
(52) U.S. Cl. ........................................................ 428/408
(58) Field of Search .......................................... 428/408

(56) References Cited

U.S. PATENT DOCUMENTS

| | | | |
|---|---|---|---|
| 3,404,061 A | 10/1968 | Shane et al. | 161/125 |
| 4,737,421 A | 4/1988 | Uemura et al. | 429/34 |
| 4,895,713 A | 1/1990 | Greinke et al. | 423/448 |
| 5,228,701 A * | 7/1993 | Greinke et al. | 277/102 |
| 5,736,076 A * | 4/1998 | Meissner et al. | 264/29.6 |
| 5,882,570 A | 3/1999 | Hayward | 264/328.18 |
| 5,902,762 A | 5/1999 | Mercuri et al. | 501/99 |
| 6,217,800 B1 | 4/2001 | Hayward | 264/29.1 |
| 2003/0044614 A1 | 3/2003 | Norley et al. | |

FOREIGN PATENT DOCUMENTS

EP    0 992 548 A2    4/2000

* cited by examiner

*Primary Examiner*—Deborah Jones
*Assistant Examiner*—Abraham Bahta
(74) *Attorney, Agent, or Firm*—Waddey & Patterson; James R. Cartiglia

(57) ABSTRACT

A graphite article comprising a compressed mass of graphite particles and a reactive lubricant, and a method of producing a graphite articles comprising a compressed mass of graphite particles and a reactive lubricant. The compressed mass of graphite particles may be impregnated with a lubricant and a resin. The lubricant may be a functionalized wax, fatty ester, silicone, or fatty acid. The lubricant may also be partially or fully fluorinated.

6 Claims, No Drawings

GRAPHITE ARTICLE COMPRISING A COMPRESSED MASS OF IMPREGNATED GRAPHITE PARTICLES AND A REACTIVE LUBRICANT

DESCRIPTION

1. Technical Field

The present invention relates to the field of thermoset/graphite molding compounds and a process for increasing material flow when preparing graphite components.

2. Background of the Art

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional such as thermal and electrical conductivity.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity due to orientation of the expanded graphite particles and graphite layers substantially parallel to the opposed faces of the sheet resulting from very high compression. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon compression of the sheet material to increase orientation. In compressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

Accordingly, there is a continuing need in the art for improved processes for producing flexible graphite sheets or products from various types of graphite materials, including those which are already resin impregnated, and for manufacture of more broadly useful products from those materials. Such improved processes are provided by the present invention.

SUMMARY OF THE INVENTION

The present invention is directed to a graphite article comprising a compressed mass of impregnated graphite particles and a reactive lubricant, and a method of producing a graphite article comprising a compressed mass of impregnated graphite particles and a reactive lubricant.

Another embodiment of the present invention is to provide a process for forming a compressed graphite article. This embodiment comprises providing a graphite source material, providing a resin, and providing a lubricant. The graphite source material is impregnated with the resin and the lubricant to form an impregnated graphite material. Finally, the graphite material is compressed to form a compressed graphite article.

Preferably, in the above embodiments, the lubricant is a functionalized wax, fatty ester, silicone, or fatty acid. The fatty acid may be commercial grade, which includes blends of fatty acids. Furthermore, the lubricant may also include fluorinated versions of the mentioned compounds (fully or partially fluorinated).

The present invention allows for the production of complex shaped articles, including but not limited to bipolar plates for fuel cell applications and finned heat sinks for electronic thermal management.

Accordingly, it is an object of the present invention to provide a graphite composite that has improved forming characteristics, including good surface definition and good flowing characteristics.

It is another object of the present invention to provide a graphite composite that is substantially free of voids.

It is another object of the present invention to provide a graphite composite forming material that has substantial material flow. Furthermore, it is another object to provide a graphite composite forming material that has non-stick characteristics, making the composite easy to remove from the compressing apparatus, such as a mold.

It is another object of the present invention to provide a graphite composite that possesses a hydrophobic quality and the ability to repel water from its surface.

Other and further objects, features, and advantages of the present invention will be readily apparent to those skilled in the art, upon a reading of the following disclosure when taken in conjunction with the accompanying drawings.

DETAILED DESCRIPTION OF THE INVENTION

Graphite is a crystalline form of carbon comprising atoms covalently bonded in flat layered planes with weaker bonds between the planes. In obtaining source materials such as the above flexible sheets of graphite, particles of graphite, such as natural graphite flake, are typically treated with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact. Additionally, the worms may be compressed together to form other shaped objects. Multiple sheets may be compressed to form mats, or the worms may be compressed to form mats.

Graphite starting materials for the flexible sheets and other objects suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as graphite prepared by chemical vapor deposition, high temperature pyrolysis of polymers, or crystallization from molten metal solutions, and the like. Natural graphite is most preferred.

The graphite starting materials for the flexible sheets and other objects used in the present invention may contain non-graphite components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than six weight percent. More preferably, the graphite employed for the present invention will have a purity of at least about 98%. In the most preferred embodiment, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 350 pph and more typically about 40 to about 160 pph. After the flakes are intercalated, any excess solution is drained from the flakes and the flakes are water-washed.

Alternatively, the quantity of the intercalation solution may be limited to between about 10 and about 40 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend can be exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one-half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. The resins can be either thermosetting or thermoplastic resins. Resins found especially useful in the practice of the present invention include acrylic-, epoxy- and phenolic-based resin systems, or mixtures thereof. Suitable epoxy resin systems include those based on diglycidyl ether or bisphenol A (DGEBA) and other multifunctional resin systems; phenolic resins that can be employed include resole and novolak phenolics.

The inventive sheet can be shaped or formed by various methods such as embossing or molding prior to curing the resin. The lubricant of the present invention provides increased flowability to the graphite material in the forming operation. Accordingly, before the material is cured, good surface definition and internal void reduction of the material is obtained. These characteristics are then maintained upon curing.

Also included in the molding process of the present invention are molding compounds that include multiple layers of graphite sheet laminated together. The different layers may have different characteristics. For example, in accordance with the present invention, different layers may be preferentially hydrophobic. Some layers may be lubricated and some may not. Some layers may be resin impregnated and some may not. This embodiment allows for more intricate designs to be pressed and allows for greater property manipulation ability at various points or thicknesses of the article. Through the proper choice of characteristics for each layer, the design of the laminated article, as well as the forming process, may be optimized.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a density of about 0.1 to about 1.1 g/cc, is thereafter processed to change the void condition of the sheet. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

Preferably, the lubricant is added with the resin during the resin impregnation step, by essentially incorporating the lubricant into the resin system prior to the resin system being brought into contact with the graphite sheet. This embodiment helps achieve a more homogeneous mixture with the lubricant being dispersed throughout the graphite molding compound.

The void condition can be used advantageously to control and adjust the morphology and functional characteristics of the final embossed article. For instance, thermal and electrical conductivity, permeation rate and leaching characteristics can be effected and potentially controlled by controlling the void condition (and, usually, the density) of the sheet prior to embossing. Thus, if a set of desired characteristics of the final embossed article is recognized prior to manipulation of the void condition, the void condition can be tailored to achieve those characteristics, to the extent possible.

Advantageously, especially when the final embossed article is intended for use as a component in an electrochemical fuel cell, the resin-impregnated flexible graphite sheet is manipulated so as to be relatively void-free, to optimize electrical and thermal conductivities. Generally, this is accomplished by achieving a density of at least about 1.4 g/cc, more preferably at least about 1.6 g/cc (depending on resin content), indicating a relatively void-free condition.

The calendered flexible graphite sheet is then passed through an embossing apparatus, including a reciprocal embossing apparatus and a roller embossing apparatus, and thereafter heated in an oven to cure the resin. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

In another embodiment of the present invention, the method of the present invention assists in preparing graphite composites that are formed from a flexible sheet as described above that is ground, and the ground sheet particles are molded to form a composite. In this to embodiment, the source material is comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. Most preferably the particles have a particle size of no greater than about 20 mesh. It may be desirable to cool the flexible graphite sheet when it is resin-impregnated as it is being comminuted to avoid heat damage to the resin system during the comminution process. In this embodiment, the lubricant can either be added to the source material sheets before they are comminuted, or the lubricant can be added to the particles after comminution.

The size of the comminuted particles may be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane electrical and thermal conductivity.

Once the flexible graphite sheet is comminuted, it is compressed into the desired shape and then cured (when resin impregnated) in the preferred embodiment. Alternatively, the sheet can be cured prior to being comminuted, although post-comminution cure is preferred. Compression can be by die pressing, roll pressing, isostatic molding or other like compression processes. Interestingly, the isotropy/anisotropy of the final article can be varied by the compression (or molding) pressure, the particular molding process utilized and the size of the particles. For instance, die pressing will result in greater alignment of the graphene layers and, thus, a more anistropic final product, than isostatic molding. Likewise, an increase in molding pressure will also result in an increase in anisotropy. Thus, adjustment of molding process and molding pressure, as well as selection of comminuted particle size, can lead to controllable variations in isotropy/anisotropy. Typical molding pressures employed range from under about 7 Mega Pascals (MPa) to at least about 240 MPa.

As stated above, the present invention utilizes internal lubricants in the above-described composites to provide increased flow during forming operations to provide better part definition, provide non-stick characteristics, and in certain circumstances provide hydrophobic characteristics. The composites of the present invention are graphite articles that comprise a compressed mass of impregnated graphite particles and a reactive lubricant. The compressed mass may be, for example, in the form of a flexible graphite sheet, mat, exfoliated graphite worms, or graphite flake.

The lubricant may be, for example, a functionalized wax, fatty ester, silicone compound, fatty acid compound, or a combination thereof. Preferably, the lubricant is a fatty acid compound. The lubricant may also include fluorinated versions of the mentioned compounds (fully or partially fluorinated).

The functionalized wax of the present invention may be a wax that is functionalized with either anionic or cationic groups. Additionally, the functionalized wax of the present invention may be a wax that contains functional groups attached to, or covalently bonded to the wax polymer backbone, such functional groups including, but not limited to, amines, amides, imides, esters, quarternary amines, carboxylic acids, hydroxyls, and the like. Preferred fatty esters are those derived from fatty acids or alcohols and carboxylic acid esters.

Stearic and palmitic acids, preferred lubricants, are typical examples of fatty acids which have long carbon chains containing a carboxyl group at one end and a methyl group at the other. The chain lengths can vary from 3 (propionic acid) to 24 (lignoceric acid), but the majority of fatty acids found in hydrogenated vegetable or animal oils are around $C_{16}$ to $C_{20}$ in length.

Preferably, the fatty acid used in the present invention is $C_{18}$ in length and has a melting point of about 70° C., and is preferably present in an amount of from about 0.5 to about 5 parts per about 100 parts resin. One fatty compound that may be used in connection with the present invention is commercial grade stearic acid, which may incorporate mixtures and blends, including mixtures of palmitic, oleic, and stearic acids, thereby broadening the melting point to a range of about 60–70° C.

When the fatty acid is used as a lubricant, the acid functionality can be reacted into an epoxy backbone during a secondary curing-type mechanism to prevent plasticization effects in the cured article. Therefore, in another embodiment, the lubricant has a carboxylic acid functionality. Triphenylphosphone (TPP) can optionally be used as a catalyst to promote the carboxyl group-epoxy group reactions. If used as a catalyst, the TPP levels are about 100 ppm with respect to the resin amount.

Preferably the melting point of the lubricant is lower than the curing temperature of the resin, which allows the compression temperature to be manipulated for optimized flow and anti-sticking features. In this embodiment, increases in pressing temperature (to about 50° C., for example) greatly affect the flow and filling characteristics, as well as material release. Optimized temperatures may be different for different resins and different loading levels (both of the acid and the resin in relation to the graphite).

Additionally, the lubricant may be a lubricant that can help provide hydrophobic qualities to the graphite article of the present invention. For example, carboxylic acids that are partially or fully fluorinated help provide water repellency. Further lubricants comprising said carboxylic acids may have a lower melting point, such as about 55° C., which makes the lubricant "active" over the molding temperature ranges discussed above. Controlling degrees of water repellency may be advantageous to articles that function in a humid/wet environment and need certain water management properties, for example when used as bipolar plates in fuel cells.

All cited patents and publications referred to in this application are incorporated by reference.

The invention thus being described, it will be obvious that it may be varied in many ways. Such variations are not to be regarded as a departure from the spirit and scope of the present invention and all such modifications as would be obvious to one skilled in the art are intended to be included within the scope of the following claims.

What is claimed is:

1. A graphite article, comprising:
   a compressed mass of particles of exfoliated graphite having a reactive lubricant selected from the group consisting of functionalized waxes, fatty esters, silicone compounds, fatty acid compounds and a partially or fully fluorinated functionalized compound impregnated therein.

2. The article of claim 1, wherein the compressed mass of graphite particles is in the form of a graphite sheet.

3. The article of claim 1, wherein the compressed mass of graphito particles further comprises a resin.

4. The article of claim 3, wherein the reactive lubricant has a lower melting point than the curing temperature of the resin.

5. The article of claim 2, wherein the graphite sheet has a pattern embossed thereon.

6. The article of claim 5, wherein the graphite sheet is substantially void-free.

* * * * *